United States Patent [19]

Namazue et al.

[11] Patent Number: 4,827,744
[45] Date of Patent: May 9, 1989

[54] VEHICLE USE LOCK SYSTEM

[75] Inventors: Hirotoshi Namazue, Fujisawa; Shouji Akutsu, Tokyo, both of Japan

[73] Assignee: Kokusan Kinzoku Kogyo Kabushiki Kaisha, Tokyo, Japan

[21] Appl. No.: 232,527

[22] Filed: Aug. 16, 1988

Related U.S. Application Data

[63] Continuation of Ser. No. 850,178, Apr. 10, 1986, abandoned.

[51] Int. Cl.⁴ ............................................. E05B 65/12
[52] U.S. Cl. ...................................... 70/252; 70/256; 70/263; 70/277; 70/282
[58] Field of Search .................. 70/245, 247, 248, 251, 70/252, 254, 256, 257, 262-265, 275, 277, 282

[56] References Cited

U.S. PATENT DOCUMENTS

| | | | |
|---|---|---|---|
| 2,796,755 | 6/1957 | Craig | 70/362 |
| 2,863,519 | 12/1958 | McNamara | 70/264 X |
| 3,718,202 | 2/1973 | Brock | 70/245 |
| 3,744,285 | 7/1973 | Barmherzig | 70/256 X |
| 3,760,422 | 9/1973 | Zimmer et al. | 340/825.69 |
| 3,782,493 | 1/1974 | Lipschutz | 70/254 X |
| 4,127,018 | 11/1978 | Brand | 70/277 X |
| 4,137,985 | 2/1979 | Winchell | 70/252 X |
| 4,240,516 | 12/1980 | Henderson et al. | 307/10 AT |
| 4,250,976 | 2/1981 | Mochida | 70/252 X |
| 4,318,288 | 3/1982 | Rifat | 70/282 X |
| 4,486,806 | 12/1984 | Mochida et al. | 307/10 AT |
| 4,509,093 | 4/1985 | Stellberger | 361/172 |
| 4,663,626 | 5/1987 | Smith | 70/256 X |
| 4,670,746 | 6/1987 | Taniguchi et al. | 70/257 X |
| 4,672,375 | 6/1987 | Mochida et al. | 70/257 X |
| 4,688,036 | 8/1987 | Hirano et al. | 70/257 X |
| 4,719,460 | 1/1988 | Takeuchi et al. | 70/252 X |

FOREIGN PATENT DOCUMENTS

| | | | |
|---|---|---|---|
| 2250368 | 4/1973 | Fed. Rep. of Germany | 70/257 |
| 3324956 | 1/1985 | Fed. Rep. of Germany | 70/256 |
| 3334049 | 4/1985 | Fed. Rep. of Germany | 70/256 |
| 2514306 | 4/1983 | France | 70/256 |
| 8001578 | 10/1981 | Netherlands | 70/262 |
| 2016074 | 9/1979 | United Kingdom | 70/263 |

Primary Examiner—Robert L. Wolfe
Assistant Examiner—Suzanne L. Dino
Attorney, Agent, or Firm—Fleit, Jacobson, Cohn & Price

[57] ABSTRACT

A vehicle enabling lock system that is wireless signal controlled, includes a vehicle side main controller and external controller which is formed into a card. These controllers are in two way communication with each other via wireless signals. There is provided further a vehicle side lock controller which is in communication with said vehicle side main controller through signal-conveyable conductors. The steering lock controller is united rigidly with the conventional steering lock for the purpose of preventing car theft.

3 Claims, 4 Drawing Sheets

VEHICLE USE LOCK SYSTEM

This application is a continuation application under 37 C.F.R. 1.62 prior application Ser. No. 850,178, filed on Apr. 10, 1986 now abandoned, entitled Vehicle use lock system.

BACKGROUND OF THE INVENTION

1. Field of the Invention

This invention relates to improvements in and relating to vehicle use lock systems. More specifically, it relates to lock systems of the above referred type and comprising a vehicle side main controller and a user side controller two-way communication by means of wireless signals and adapted for control of vehicle door locking and unlocking operations as well as vehicle steering locking and unlocking operations.

2. Description of the Prior Art

As a conventional technique, a wireless signal controlled, vehicle use lock system of the following features is known.

More specifically, a specifically selected code signal, preferably in form of pulse pattern signal series same as that destined for to-be-transmitted from the user side controller is beforehand memorized in the vehicle side main controller. When wireless mutual communication is initiated and maintained between the both controllers, the vehicle side controller reads out and introduces the code signal coming from the user side controller into the vehicle side controller. As may be well supposed, comparison is made between the both coded signals, and when there is a coincidence, the vehicle side controller adjudges the coming code signal to be true and thus, an operation signal output will be delivered to the door lock controller or the trunk opener for unlocking of the door or the trunk lid.

With use of the above kind of lock system, it is possible through execution mutual wireless communication between the vehicle side main controller and the user side controller, locking and unlocking jobs for the vehicle door or vehicle trunk lid can be effectively executed. However, if the system also unlocks a steering lock, the steering lock cannot be unlocked through the interval controller without use of the engine key. Thus, in this case, the engine start cannot be realized without the key.

For obviating this drawback, a solenoid-operated actuator could be provided for establishing substantially rigid connection with the steering lock.

It should be noted, however, that speaking generally, electrical conductors connecting the solenoid with the current source must be exposed at least partially out of the steering lock. If a thief should break the exposed part of the leads and the battery is connected thereto for making a short circuited connection, the solenoid could be brought to operation. Thus, the engine could be started for theft purpose. Therefore, such modified design and arrangement could be adopted only defectively.

SUMMARY OF THE INVENTION

It is therefore one of the objects of the present invention to obviate the aforementioned conventional drawback and to enable an unlocking operation of the vehicle door(s) and vehicle trunk lid, as occasionally wanted without use of the engine key, in addition to the engine starting.

A subsidiary object of the invention is to improve the aforementioned antitheft performance.

For attaining the aforementioned objects, it is proposed according to the invention to provide a wireless signal controlled, vehicle use lock system, comprising a vehicle side main controller and a user side controller, said both controllers being in communication with each other via wireless signals The system also includes a separate internal vehicle lock controller having two-way communication with said vehicle side main controller through signal-conveyable conductors, said system being characterized by that the said steering lock controller is united with the conventional steering lock preferably rigidly.

In the wireless signal controlled, vehicle enabling lock system, the steering lock controller cooperates with a plunger unit actuator including a solenoid and a movable plunger, said steering lock, said plunger unit and said steering lock controller being mounted rigidly together within a large housing.

In the above system wherein when there is a coincidence between a code signal preferably in the form of a pulse pattern series signal transmitted from said user side controller and a code signal specifically selected and permanently preset in the vehicle side main controller, said steering lock is brought into actuation.

In the above system, the said code signal may be a rectangular pulse series having preselected pitch distances. As an alternative way, in the above system, the said code signal may be a saw tooth pulse series having preselected, generally different pitch distances.

BRIEF DESCRIPTION OF THE DRAWINGS

In the following, the invention will be described more in detail with reference to a preferred embodiment shown in the accompanying drawings, in which.

DETAILED DESCRIPTION OF A PREFERRED EMBODIMENT

Figure 1:
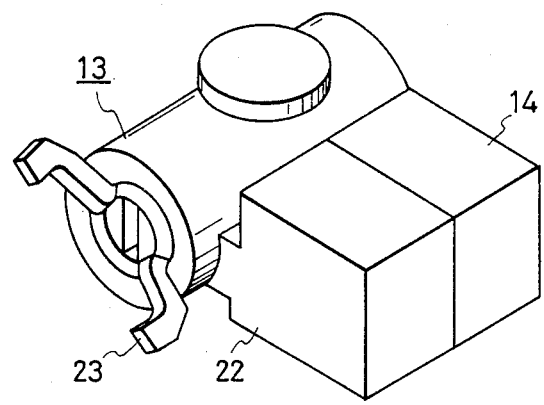
FIG. 1 is a perspective outside view of the inventive wireless controlled vehicle steering lock and unlock system.
Figure 2:
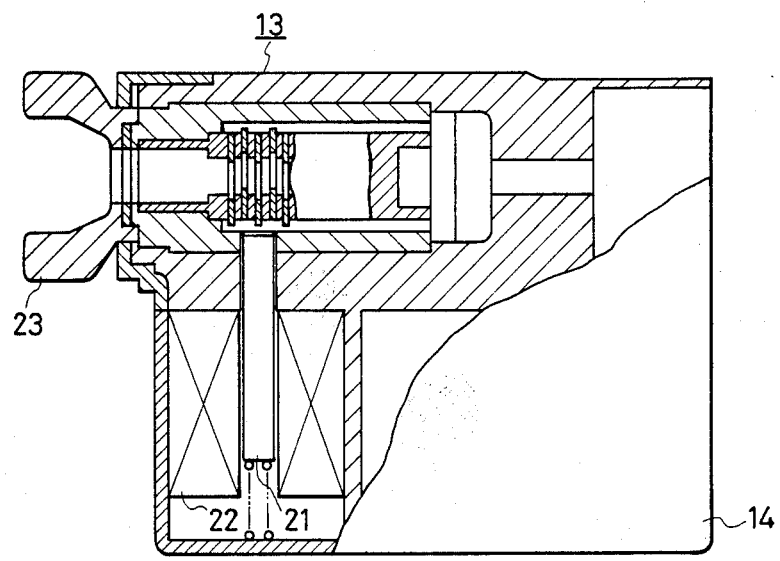
FIG. 2 is an enlarged elevational view, partially sectioned and partially broken away.

In FIGS. 1-2, numeral 13 is a steering lock assembly; 23 is a steering lock knob rotatably attached thereto; 22 is an actuator consisting substantially of an electromagnetically energizable solenoid 17 and plunger 21; and 14 represents a steering lock controller. These members 13, 14, 22 and 23 are assembled together as shown in FIGS. 1 and 2.

Thus, it will be seen that the steering controller 14 is assembled rigidly together with the steering lock 13 and the actuator 22 is rigidly built onto the latter, as an important feature of the invention.

Figure 3:
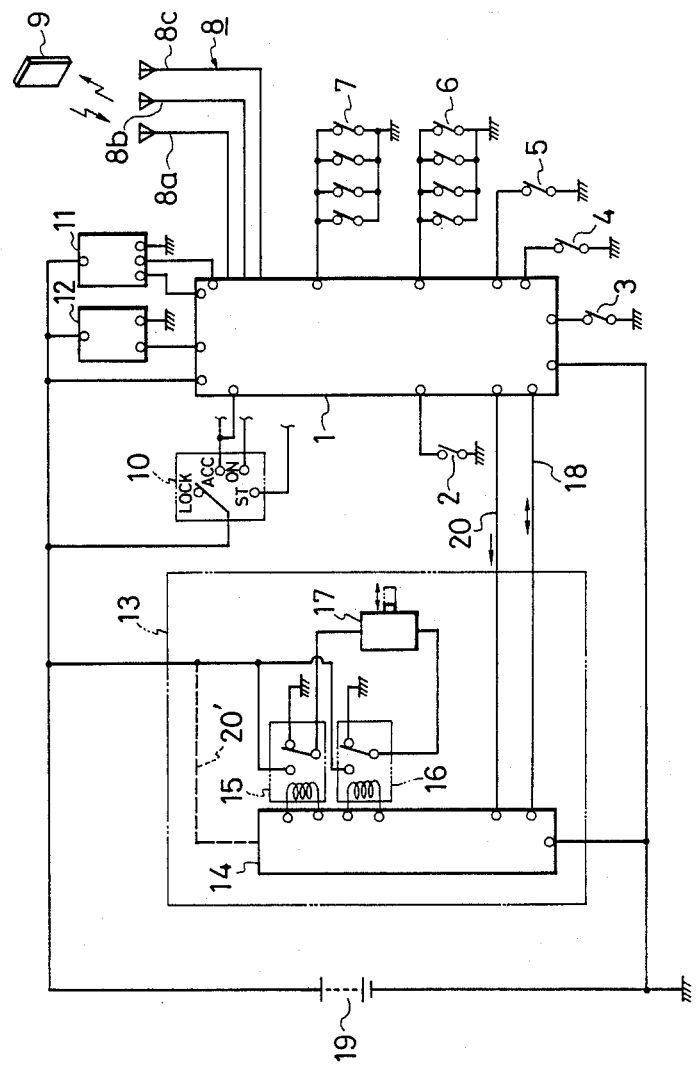
FIG. 3 is a circuit diagram of the power source section employed, several parts thereof being, however, represented briefly in blocks.
Figure 4:
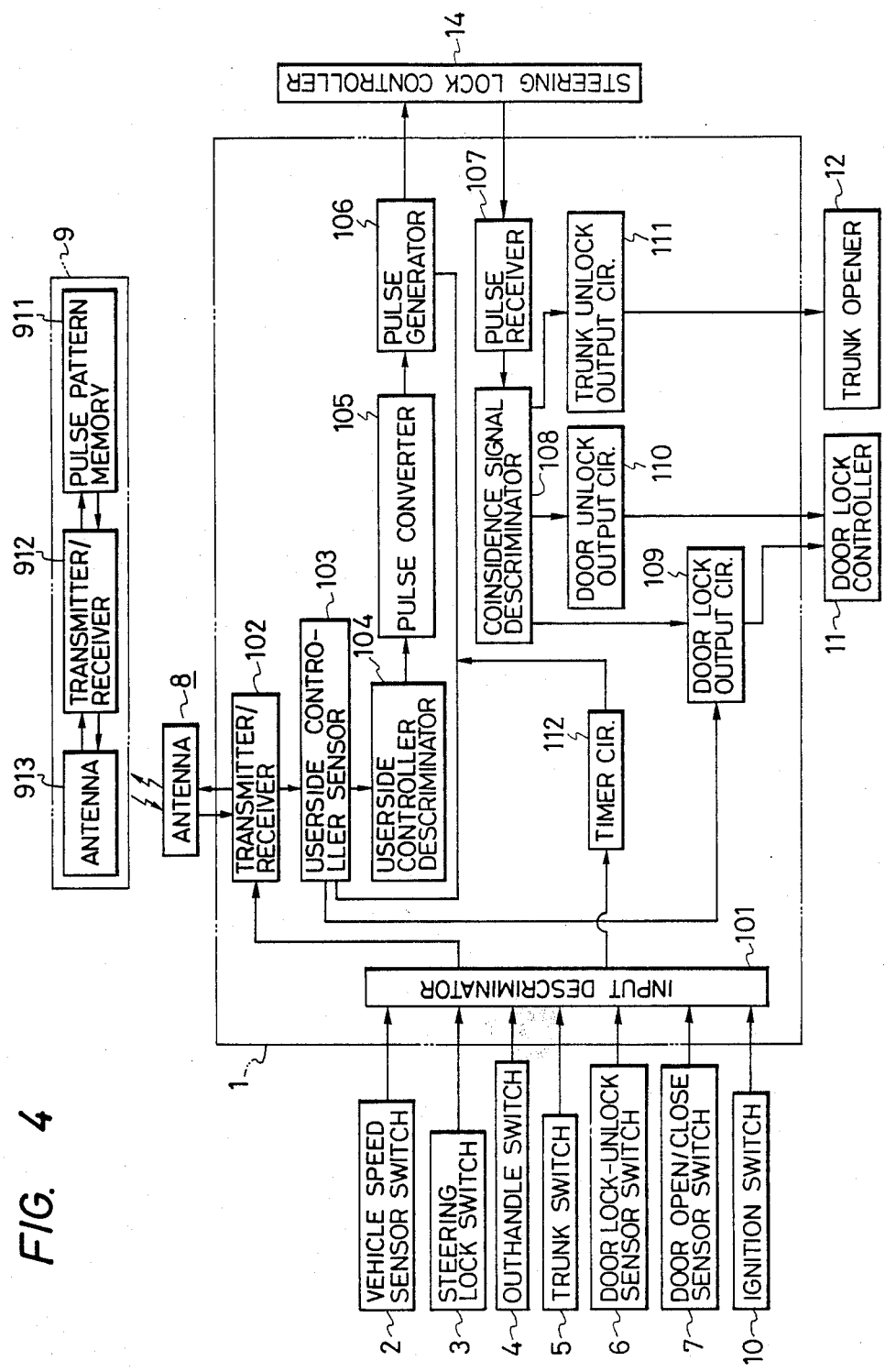
FIG. 4 is a block diagram of the vehicle side main controller together with user side controller employed.

In FIG. 3, numeral 1 represents a vehicle side main controller, details of which is shown in FIG. 4. Numeral 2 represents a conventional vehicle speed sensor switch which is adapted for delivery of an output when the vehicle speed reaches a predetermined value.

Numeral 3 represents a hidden steering lock switch positioned near the knob 23 and in such a manner that a third person is difficult to find out the switch.

Numeral 4 represents a conventional door handle switch which is made on and off when the door opening and closing handle is opened and closed, respectively.

Numeral 5 is a conventional trunk switch which is positioned on the vehicle trunk lid or the like.

Numeral 6 represents a door lock and unlock sensor switch which delivers a high level output when the door is locked.

Numeral 7 represents a conventional door opening and closing sensor switch which delivers a high level output when the vehicle door is opened.

Numeral 8 represents an antenna group comprising three different antenna elements 8a; 8b; 8c which are positioned at remote and hidden locations, such as those in or on the side mirror, in a hidden interior place such as under the assistant driver's seat; and as within the trunk space.

Numeral 9 represents a user side controller, preferably fabricated into a card style, as is schematically shown in FIG. 3.

Numeral 10 represents only schematically a conventional ignition switch.

Numeral 11 represents a conventional door lock controller adapted for locking and unlocking of the vehicle door, not shown.

Numeral 12 represents a conventional trunk opener which is adapted for control of opening and closing of the vehicle trunk, not shown.

Numeral 13 represents a conventional steering lock, while 14 represents a conventional steering lock controller.

Numeral 15 represents an unlock operation relay and 16 a lock operation relay; 17 a bistable solenoid of the actuator 22; 18 a signal feed line; and 20 a current or voltage supply line.

In place of the said supply line 20, a direct feed line 20' shown in a dotted line in FIG. 3 may be used for direct feeding the power from voltage source or battery 19 to steering lock controller. In this case, however, the controller 14 may receive disadvantageous operation noises coming from the bistable solenoid.

Now referring to FIG. 4, detailed constituents and arrangement of the vehicle side main controller 1 will be set forth hereinbelow.

Numeral 101 represents an input adjudging or discriminating circuit which delivers an output to the circuits to be described when closure of said switches 2–7; 10 is sensed.

Numeral 102 is adapted for receiving signals from the antenna group 8 as well as those from the said circuit 101; and adapted for sending reversely wireless signals.

Numeral 103 represents a user side controller sensor circuit which delivers an output when signal(s) is(are) received at the antenna group 8 from the user side controller 9 to be more fully described hereinbelow.

Numeral 104 represents a user side controller adjudgement circuit adapted for sending an output when the said sensor circuit 103 senses signal(s) from the said controller 9 and when there is a coincidence between the pulse signal delivered from the controller 9 and a predetermined and preset signal.

Numeral 105 represents a pulse conversion circuit which converts upon reception of the output from the said adjudgement circuit 104, into pulse signals adapted for the steering lock controller 14.

Numeral 106 represents a pulse generating circuit which continues to deliver a predetermined pulse series by the output from the said circuit 105 as long as an output is being input from timer circuit 112 to be described.

Numeral 107 represents a pulse receiver circuit which is adapted for receiving pulses from steering lock controller 14.

Numeral 108 represents a coincidence signal adjudgement circuit which adjudges the pulse signal(s) received from the said pulse receiver circuit 107 to correspond to either one of the door lock signal, door unlock signal or trunk unlock signal.

Numerals 109, 110 and 111 represent respectively a door lock output circuit, door unlock output circuit and trunk unlock output circuit, which deliver, upon reception of output from the said circuit 108, output(s) to door lock controller 11 and trunk opener 12, as specifically shown in FIG. 4.

Numeral 112 represents the timer circuit which delivers output for a predetermined time period and upon turning the outhandle switch 4 off.

As will be seen most clearly, the user side controller 9 comprises a memory circuit 911 preserving beforehand and permanently a specifically selected pulse pattern for the vehicle under consideration; a transmitter/receiver combined unit 912 which is adapted for receiving signals from the corresponding transmitter/receiver combined unit 102 through antenna 8 and upon the outhandle switch being turned on, as well as being adapted for transmitting the signals delivered from the memory 911, and an antenna 913.

Figure 5:
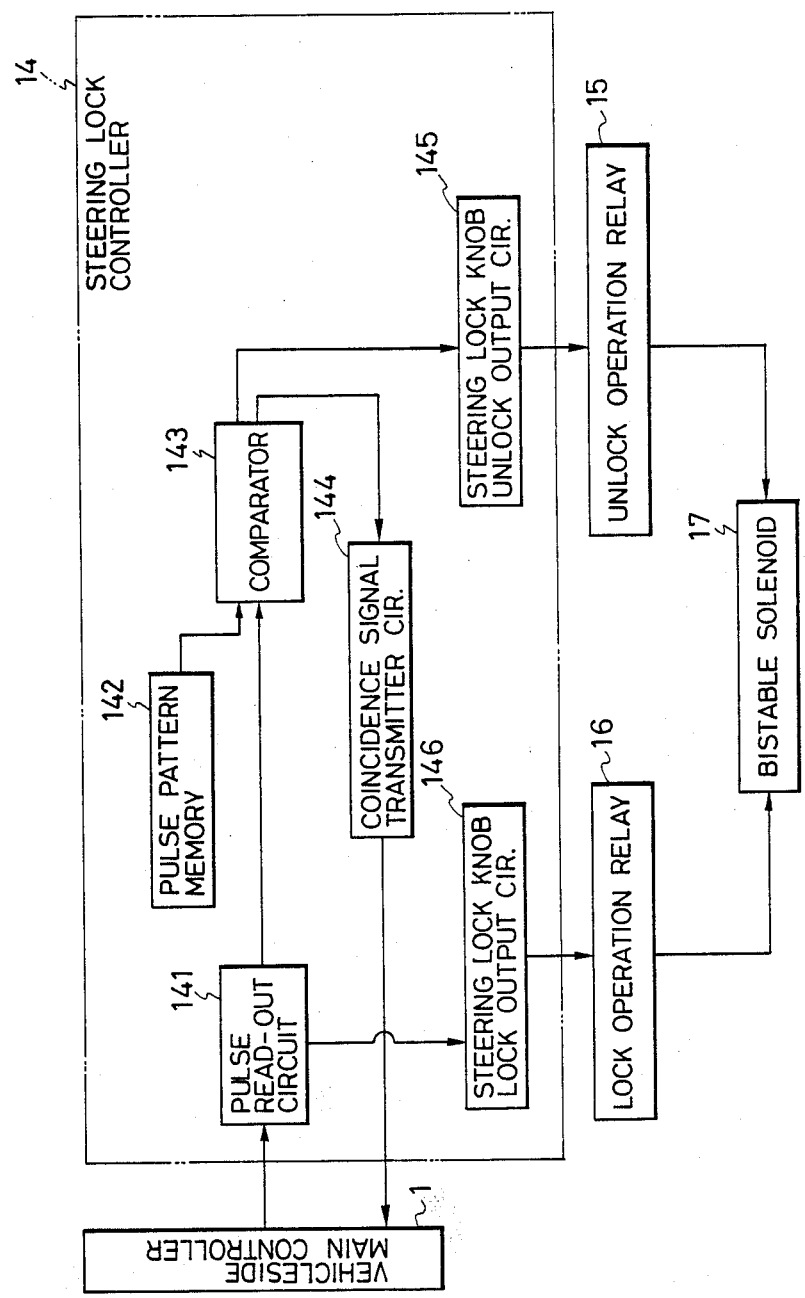
FIG. 5 is a block diagram of the steering block controller employed.

In FIG. 5 showing mainly the steering lock controller 14, numeral 141 shows a pulse read-out circuit which is adapted for reading out the pulse signals from pulse generator 106 of vehicle side main controller 1 already mentioned.

Numeral 142 represents a memory preserving therein two kinds of signals: one being an operating signal for unlocking the steering lock knob; and the other being those for door-unlocking and trunk-unlocking.

Numeral 143 represents a comparator, adapted for making comparison between the output from the memory 142 and the output from the read-out circuit 141. When there is a coincidence between these both, the said comparator will deliver a steering lock knob unlock output or door unlock- or trunk unlock output.

Numeral 144 represents a coincidence signal transmitter which is adapted for receiving coincidence signal from the comparator 143 and transmitting it towards pulse receiver 107.

Numeral 145 represents a steering lock knob unlocking output circuit which receives output from the comparator 143 and delivers thus an operating signal to the unlock operation relay 15 already mentioned.

Finally, numeral 146 represents a steering lock knob locking output circuit which receives output from the read-out circuit 141 and then delivers output to lock operation relay 16.

The operation of the inventive system is as follows:

At first, a case will be described in which the door(s) as well as the steering lock is unlocked.

It is assumed that the user personally carries the user side controller 9.

When the user turns the outhandle switch 4 on, then the vehicle side main controller 1 initiates to communicate with the user side controller 9. When at this moment, a specifically selected pulse pattern from the memory 911 of controller 9 is received by transmitter/-receiver combined unit 102, the sensor circuit 103 acknowledges the very existence of user side controller 9, thus delivering an output.

And the pulse pattern delivered from the memory 911 and sensed at the user side controller sensor circuit 103 is subjected to adjudging at the adjudger 104. In this way, the person who comes near the vehicle is adjudged to be the vehicle owner or a person authorized by him, and an output will be issued.

As a result, pulse conversion will be performed at the circuit 105, so as to deliver steering lock pulses which are then fed through pulse generator 106 to steering lock controller 14. The thus fed-in pulse pattern is read-in at the circuit 141 and then subjected to comparison at the comparator 143 with the pulse pattern read-out from the memory 142. When there is a coincidence between the input signal and the memory stored signal, operation signal(s) is(are) fed to steering lock knob unlock output circuit 144 and coincidence signal sender 145.

And, the signal from the output circuit 145 is delivered to unlock operation relay 15, so as to drive the bistable solenoid 17 for rendering steering lock knob 23 rotatable.

On the other hand, signal from the circuit 145 is fed to the vehicle side main controller 1, read out at the pulse receiver circuit 107 and then determined adjudgingly at the circuit 108 if it be adapted for door unlocking or trunk unlocking, as the case may be.

Thereupon, the signal will be fed to door unlock output circuit 110. In this way, door unlock controller 11 receives operation signal for unlocking the vehicle door.

Next, an operational mode for unlocking exclusively the vehicle trunk will be explained.

When the person carrying the user side controller 9 comes near the vehicle and makes the trunk switch 5 on, then the vehicle side main controller 1 will initiate communication with the user side controller 9.

Then, in the similar way as before, the controller 1 will deliver the pulse pattern to steering lock controller 14. Since the steering lock 13 needs not to be unlocked in the present case, said on-making of trunk switch 5 will cause the comparator 143 to feed a signal exclusively to coincidence signal sender circuit 144 which will then deliver a coincidence signal to vehicle side main controller 1, the latter feeding thereby an output to trunk opener 12, so as to unlock the trunk lid.

As a third operational mode, locking operation of steering lock and door lock will be illustrated below.

When the user operates the outhandle switch 4 of an unlocked vehicle, the vehicle side main controller 1 will deliver a locking operation signal to steering lock controller 14. This signal is read out at the circuit 141 and signal will be fed through steering lock knob locking output circuit 146 to lock operation relay 16, so as to energize solenoid 17 for disabling the knob 23, thus rendering it unable to rotate.

On the other hand, since the user side controller sensor circuit 103 of vehicle side main controller 1 will deliver an output signal, the door lock output circuit 109 will deliver a signal for locking the door.

Next, the steering lock operation relying upon the adjudging operation of the vehicle side main controller will be illustrated hereinbelow:

As is commonly known, the car driver may depart the vehicle while the vehicle doors are kept unlocked.

If, under this condition, the steering lock 13 be kept always unlocked, a third person can open easily the vehicle doors for unauthorized entry and car theft.

For avoiding such a danger as above mentioned, the vehicle side main controller 1 must be designed and arranged in such a way that the ignition switch is positioned at ACC- or On-position within a predetermined time period defined or preset by timer circuit 112. If not, once when the pulse signal is delivered from pulse generator circuit 106 in the similar manner with the locking operation of the steering knob, which signal will be fed through the lock operation relay 16 so that the said knob 23 may be brought to its unrotatable position.

As a further operational mode, such a case that the steering lock is exclusively unlocked will now be described.

As was hereinabove briefly mentioned, if the preset time period at the timer circuit 112 should have lapsed with the steering lock 13 kept at its operational condition, by a certain or other cause, the lock 13 would be brought to its locked position. Under these conditions, even if the steering lock knob 23 is turned manually for starting the vehicle engine, not shown, the latter could not be energized and started.

Therefore, if the user-operable switching means adapted for bringing the steering lock knob 23 to its unlocked positioned be only one such as outhandle switch 4, the user must personally move out of the vehicle or personally manipulate the outhandle switch 4 to "on" through the vehicle window.

If, however, the steering switch 3 is provided or positioned near the steering lock 13 so as to provide the user in the vehicle interior with a chance and possibility for operating the knob 23 to its rotatable position similar the afore mentioned method of effecting unlocking operation of the steering lock, the above-mentioned troublesome situation can be avoided.

In summarizing the features of the invention, comparison is made between the pulse pattern transmitted from the user side controller and that which has been preserved beforehand at the vehicle side main controller and only when there is really coincidence therebetween, the steering lock knob can be operated to its rotatable position. Thus, even if an unauthorized person or thief should break intermediate lead wire(s) from the power battery 19 upstream of the steering lock controller and connect thereto the power battery, the actuator 22 in form of a solenoid 17 and plunger 21 built-in with the steering lock 13 could not be energized and actuated. Therefore, with use of the present inventive steering lock system, extraordinary high anti-vehicle theft security is provided.

Further and generally speaking, the vehicle door key cylinder lock, the trunk key cylinder lock, the steering lock and the engine key are provided in form of a specifically selected and combined set peculiar to each separate vehicle. Thus, a different set is provided for each vehicle.

In the case of prior wireless signal controlled lock and unlocking systems, the signal pulse pattern transmitted from the user side controller is also different from vehicle to vehicle.

Generally speaking, therefore, automotive car manufacturers, must provide the key sets and the wireless signal-controlled vehicle lock sets under separate management controls, thus giving rise to a considerable increase in the management cost.

In the present inventive system, however, each specifically selected pulse pattern peculiar to each car vehicle and to be preserved in a vehicle side memory is permanently built into the steering lock. Therefore, the both kinds of management control systems may be supervised in common to considerably reduce management cost, in this respect.

What is claimed is:

1. An enabling lock system for a vehicle, said enabling lock system comprising:
   a main vehicle controller,
   a card style external controller in communication with said main vehicle controller through wireless signals,
   vehicle lock means operatively connected to said main vehicle controller for securing the vehicle, said vehicle lock control means including a door lock controller and a steering controller, and a source of electrical power connected to said door lock controller and said steering controller,
   an ignition key operated steering lock assembly having a steering lock controller with a manually operating assist knob arm and an engine ignition switch, each of said steering lock controller and said engine ignition switch being connected to said source of electrical power and said main vehicle controller,
   a hidden steering lock switch being positioned near said knob arm and connected to said source of electrical power and said main controller,
   a door handle switch connected to said main controller and having the positions of on or off when the door handle is either opened or closed, respectively
   electrical conductor means for establishing two-way communication between said main vehicle controller and said steering lock controller, said two-way communication being established from said door lock controller,
   actuator means engageable with said steering lock controller for enabling and disabling thereof;
   housing means for enclosing said actuator means in common with said key operated steering lock assembly and said steering lock controller in rigidly fixed relation to each other, said actuator means being electrically connected to said power source through said steering lock controller upstream thereof to prevent release of said steering lock controller in response to disconnection of said power source therefrom so that even if unauthorized persons should break intermediate leads from said power source upstream of said steering lock controller and connect thereto a new power source or reconnect said power source directly thereto, said actuator means cannot be energized and actuated,
   an antenna group serving for establishment of said two-way communication between said card style external controller and said main vehicle controller, said antenna group comprising at least three antenna elements, each being positioned at remote and hidden locations in the vehicle such that said antenna elements are in close proximity of a side mirror of the vehicle, an assistant driver's seat and within trunk space thereof, and each said antenna element being connected to said main vehicle controller,
   said steering lock controller including a pair of relay devices connected to said actuator means for respectively enabling and disabling said key operated steering lock assembly,
   a first coded signal being transmitted by said card style external controller, said first coded signal being in the form of a pulse pattern signal,
   a second code signal being specifically selected and permanently preset in said main vehicle controller, and
   a coincidence signal discriminator means for determining when there is a coincidence between said first and second coded signal during actuation of said key operated steering lock assembly.

2. The combination of claim 1, wherein said first and second coded signal is a rectangular pulse series having preselected pitch distances.

3. The combination of claim 1, wherein said first and second coded signal is a saw tooth pulse series having preselected different pitch distances.

* * * * *